(12) United States Patent
Umeda

(10) Patent No.: US 9,418,793 B2
(45) Date of Patent: Aug. 16, 2016

(54) VARIABLE CAPACITANCE DEVICE

(75) Inventor: Keiichi Umeda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 375 days.

(21) Appl. No.: 13/535,388

(22) Filed: Jun. 28, 2012

(65) Prior Publication Data

US 2013/0170092 A1 Jul. 4, 2013

Related U.S. Application Data

(63) Continuation of application No. PCT/JP2010/070766, filed on Nov. 22, 2010.

(30) Foreign Application Priority Data

Jan. 14, 2010 (JP) .................................. 2010-005786

(51) Int. Cl.
*H01G 7/00* (2006.01)
*H01G 7/06* (2006.01)
(Continued)

(52) U.S. Cl.
CPC ... *H01G 7/00* (2013.01); *H01G 5/16* (2013.01)

(58) Field of Classification Search
CPC ............. H01G 5/16; H01G 5/18; H01G 7/00; H01G 7/06; H01H 59/0009; G01D 5/2417
USPC ......... 361/281, 283.1, 280; 200/181; 324/661
See application file for complete search history.

(56) References Cited

U.S. PATENT DOCUMENTS

| | | | |
|---|---|---|---|
| 5,578,976 A | 11/1996 | Yao | |
| 6,507,475 B1 * | 1/2003 | Sun | .......................... H01G 5/18 257/E27.048 |
| 2001/0022541 A1 * | 9/2001 | Kasai et al. | .................... 333/105 |

(Continued)

FOREIGN PATENT DOCUMENTS

| | | |
|---|---|---|
| JP | 09-017300 A | 1/1997 |
| JP | 10-149951 A | 6/1998 |

(Continued)

OTHER PUBLICATIONS

Official Communication issued in International Patent Application No. PCT/JP2010/070766, mailed on Feb. 22, 2011.

*Primary Examiner* — Eric Thomas
*Assistant Examiner* — Arun Ramaswamy
(74) *Attorney, Agent, or Firm* — Keating & Bennett, LLP

(57) ABSTRACT

A variable capacitance device includes a substrate, a beam portion, lower drive electrodes and upper drive electrodes. The beam portion is made of an insulating material and is connected to the substrate via an anchor portion. In the lower drive electrode and the upper drive electrode, electrostatic attraction generated by the application of a DC voltage continuously changes. In the lower drive electrodes and the upper drive electrode, electrostatic capacitance generated by the application of an RF signal between the electrodes on both sides continuously changes in accordance with the deformation of the beam portion due to the electrostatic attraction. The beam portion includes an inner circumferential portion including the upper drive electrode, an outer circumferential portion including the upper drive electrode, and ladder portions sandwiched by the inner circumferential portion and the outer circumferential portion. The beam portion has a cross-sectional area that is reduced by the ladder portions.

8 Claims, 11 Drawing Sheets

(51) Int. Cl.
*G01R 27/26* (2006.01)
*H01G 5/16* (2006.01)

(56) References Cited

U.S. PATENT DOCUMENTS

2002/0018334 A1* 2/2002 Hill et al. .................. 361/278
2006/0055287 A1* 3/2006 Kawakubo et al. ......... 310/348
2009/0051251 A1* 2/2009 Kawakubo et al. ......... 310/332
2009/0189487 A1* 7/2009 Nishigaki ............. B81B 3/0021
310/331

FOREIGN PATENT DOCUMENTS

| JP | 3538109 B2 | 6/2004 |
| JP | 2006-087231 A | 3/2006 |
| JP | 2009-055683 A | 3/2009 |

* cited by examiner

Si 30um  ε r=11.8、W 200nm Mesh=10um $C_z \Rightarrow 1.75 \times 10^{-2}$ (pF)

Ra=0.9nm

Ra=1.0nm

| ATOMIC SYMBOL | SUBSTANCE NAME | COEFFICIENT OF LINEAR EXPANSION (10-6/deg) |
|---|---|---|
| Si | SILICON | 3.4 |
| Pyx | GLASS | 3.2 |
| W | TUNGSTEN | 4.5 |
| Mo | MOLYBDENUM | 5.0 |
FIG. 8A
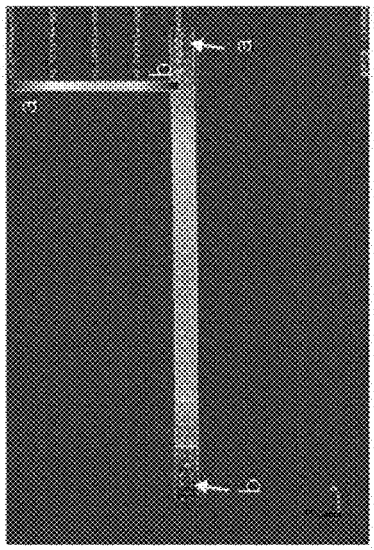
FIG. 8B
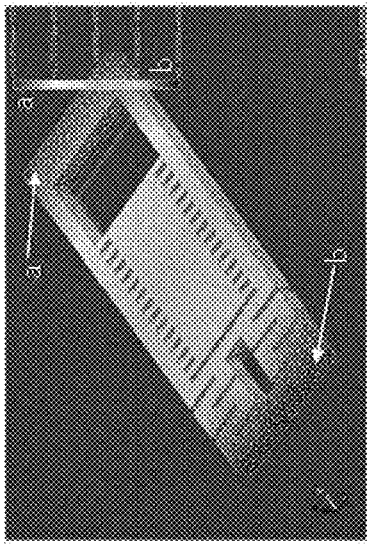
FIG. 8C

VARIABLE CAPACITANCE DEVICE

BACKGROUND OF THE INVENTION

1. Field of the Invention

The present invention relates to a variable capacitance device that provides a variable capacitor by using a Micro-Electro-Mechanical Systems (MEMS) device driven by electrostatic attraction.

2. Description of the Related Art

In the past, a variable capacitance device using an electrostatically driven MEMS has been used in some cases (see Japanese Unexamined Patent Application Publication No. 09-17300 and Japanese Patent No. 3538109).

FIGS. 1A-1C are diagrams for explaining a configuration example of an existing variable capacitance device.

A variable capacitance device 101 includes movable plates 102 and 103. The movable plates 102 and 103 are each made of a conductive material, have a doubly supported beam structure, and are disposed next to each other with a gap therebetween. The movable plate 103 has a convex surface facing the movable plate 102 and is provided with a dielectric layer 104. When a DC voltage is applied between the movable plates 102 and 103, electrostatic attraction attracting the movable plates 102 and 103 to each other is generated in the movable plates 102 and 103, and the gap between the movable plates 102 and 103 is reduced. When a convex tip region of the movable plate 103 comes into contact with the dielectric layer 104, the capacitance of the variable capacitance device 101 is substantially increased. If the DC voltage is changed, the contact area of the movable plate 103 with the dielectric layer 104 changes, and the capacitance changes in accordance with the contact area.

In the existing variable capacitance device, a DC voltage and an RF signal are applied to a common electrode. Therefore, it is necessary to separate a DC component and an AC component from each other by inserting a resistor and a capacitor in a DC voltage line and an RF signal line. The insertion of a resistor and a capacitor leads to the possibility of an increase in insertion loss and so forth. It is therefore conceivable to structurally separate the DC voltage line and the RF signal line from each other to thereby electrically separate the DC component and the AC component from each other without using a resistor and a capacitor. Also in this case, however, if an electrode connected to the DC voltage line and an electrode connected to the RF signal line are formed in the same dielectric material, capacitive coupling occurs between the two electrodes. As a result, it is difficult to completely electrically separate the DC component and the AC component from each other. To prevent property degradation of the RF signal, it is necessary to set the coupling capacitance to, for example, 0.1 pF or less.

SUMMARY OF THE INVENTION

In view of the above, preferred embodiments of the present invention provide a variable capacitance device that reduces and prevents a capacitive coupling between two electrodes and prevents property degradation of an RF signal, even if the electrode connected to a DC voltage line and the electrode connected to an RF signal line are formed in the same dielectric material.

A variable capacitance device according to a preferred embodiment of the present invention includes a substrate, a beam portion, a drive capacitance portion, and a variable capacitor portion. The beam portion is made of an insulating material, and includes an end portion extending in a principal axis direction and connected to the substrate via an anchor structure. The drive capacitance portion includes a pair of rail-shaped electrodes including longer sides extending in the principal axis direction and provided to the beam portion and the substrate, and an electrostatic attraction acting between the two electrodes continuously changes in accordance with an electrostatic capacitance generated by the application of a DC voltage. The variable capacitor portion includes a pair of rail-shaped electrodes including longer sides extending in the principal axis direction and provided to the beam portion and the substrate, and an electrostatic capacitance generated by the application of an RF signal between the two electrodes continuously changes in accordance with the deformation of the beam portion due to the electrostatic attraction. Further, the beam portion has a structure in which a region sandwiched by a region including the variable capacitor portion and a region including the drive capacitance portion is locally reduced in cross-sectional area per unit length along the principal axis direction.

In this configuration, a coupling capacitance via the beam portion is generated between the variable capacitor portion and the drive capacitance portion. The value of this coupling capacitance depends on the cross-sectional area of the beam portion in the region sandwiched by the variable capacitor portion and the drive capacitance portion. If the cross-sectional area of the beam portion is reduced, therefore, it is possible to reduce and prevent the coupling capacitance, and to separate the DC voltage and the RF signal from each other without causing an increase in insertion loss. Further, the reduction in cross-sectional area of the beam portion results in improvement in flexibility of the beam portion, enhancement in bending sensitivity of the beam portion to the DC voltage, and enhancement in setting accuracy of variable capacitance.

It is preferable that, in the beam portion of a preferred embodiment of the present invention, the region that is locally reduced in cross-sectional area is provided in plurality in the principal axis direction. This configuration is capable of further reducing and preventing the coupling capacitance between the variable capacitor portion and the drive capacitance portion. Further, the flexibility of the beam portion is improved over the entire length along the principal axis direction, and the area of a region of the beam portion approaching the substrate is linearly increased in accordance with the DC voltage. It is therefore possible to finely and accurately control the amount of change in the variable capacitance.

It is preferable that the region that is locally reduced in cross-sectional area according to a preferred embodiment of the present invention includes openings penetrating two main surfaces of the beam portion. In this configuration, if the openings are provided by the use of a method such as etching, simplification of the formation and improvement in shape accuracy are attained.

It is preferable that the variable capacitor portion according to a preferred embodiment of the present invention has a configuration in which two pairs of rail-shaped electrodes are connected by an electrode on the side of the beam portion and the RF signal is applied to two electrodes on the side of the substrate. This configuration corresponds to a structure which series-connects two pairs of electrodes on the side of the beam portion and applies the RF signal between two electrodes on the side of the substrate (hereinafter referred to as the MIMIM structure). The electrostatic capacitance and the electrostatic attraction of the MIMIM structure are about ¼ times the electrostatic capacitance and the electrostatic attraction of a structure which applies the RF signal between an electrode on the side of the beam portion and an electrode on the side of the substrate (hereinafter referred to as the MIM structure). It is therefore possible to significantly reduce electrostatic attraction due to self-actuation based on the RF signal.

It is preferable that the drive capacitance portion of a preferred embodiment of the present invention has a configuration in which the DC voltage is applied to an electrode on the side of the beam portion and an electrode on the side of the substrate of the rail-shaped electrodes. This configuration corresponds to a structure which applies the DC voltage between a U-shaped electrode on the side of the beam portion and an electrode on the side of the substrate (MIM structure). The electrostatic capacitance and the electrostatic attraction of the MIM structure are about four times the electrostatic capacitance and the electrostatic attraction of a structure which series-connects electrodes on the beam side of two pairs of electrodes and applies the DC voltage between two electrodes on the side of the substrate (MIMIM structure). It is therefore possible to reduce the DC voltage required to obtain the same electrostatic attraction.

It is preferable that the beam portion according to a preferred embodiment of the present invention has a cantilever beam structure. The cantilever beam structure is capable of reducing the spring constant and the occupied area of the beam portion more than a doubly supported beam structure.

It is preferable that the beam portion, the substrate, and the rail-shaped electrodes provided to the beam portion of a preferred embodiment of the present invention are defined by, for example, a high-resistivity Si substrate, a glass substrate, and tungsten electrodes or molybdenum electrodes, respectively. It is particularly preferable that the rail-shaped electrodes provided to the beam portion are formed on the beam portion by a sputtering method, for example. With the use of the glass substrate and the high-resistivity Si substrate, it is possible to form a highly accurate variable capacitance device with a stable gap due to anodic bonding therebetween. In a tungsten electrode or a molybdenum electrode, resistance degradation due to surface roughness or diffusion is not easily caused even when the electrode is subjected to a heat load due to anodic bonding, and stable driving characteristic is obtained. Further, the difference in the coefficient of linear expansion between the electrode and the Si substrate is small. It is therefore possible to significantly reduce and prevent warping under a high-temperature environment, and variations in drive voltage are reduced.

According to various preferred embodiments of the present invention, the coupling capacitance via the beam portion is generated between the variable capacitor portion and the drive capacitance portion. The value of the coupling capacitance depends on the cross-sectional area of the beam portion between the variable capacitor portion and the drive capacitance portion. If the cross-sectional area of the beam portion is reduced, therefore, it is possible to significantly reduce the coupling capacitance, and to separate the DC voltage and the RF signal from each other without causing property degradation. Further, the reduction in cross-sectional area of the beam portion results in improvement in flexibility of the beam portion, enhancement in sensitivity of the bending amount of the beam portion to the DC voltage, and enhancement in setting accuracy of variable capacitance.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 8A-8C are diagrams for explaining coefficients of linear expansion of the upper drive electrodes and the beam portion of the variable capacitance device of FIG. 2.

DETAILED DESCRIPTION OF THE PREFERRED EMBODIMENTS

Description will be made of a configuration example of a variable capacitance device 1 according to a first preferred embodiment of the present invention.

Figure 1A:
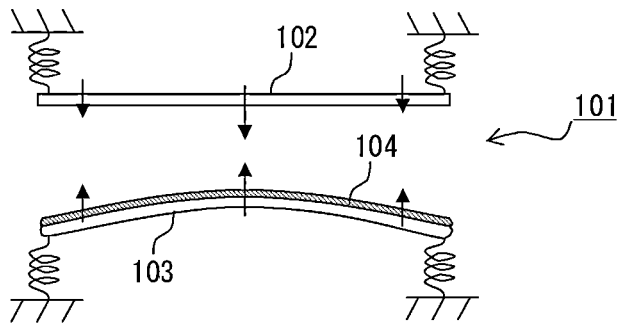
FIGS. 1A-1C are diagrams for explaining a configuration example of an existing variable capacitance device.
Figure 1B:
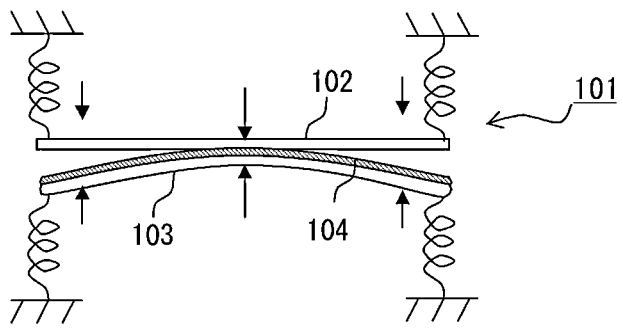
Figure 1C:
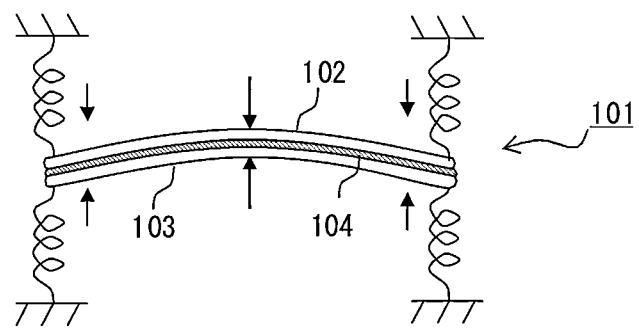
Figure 2A:
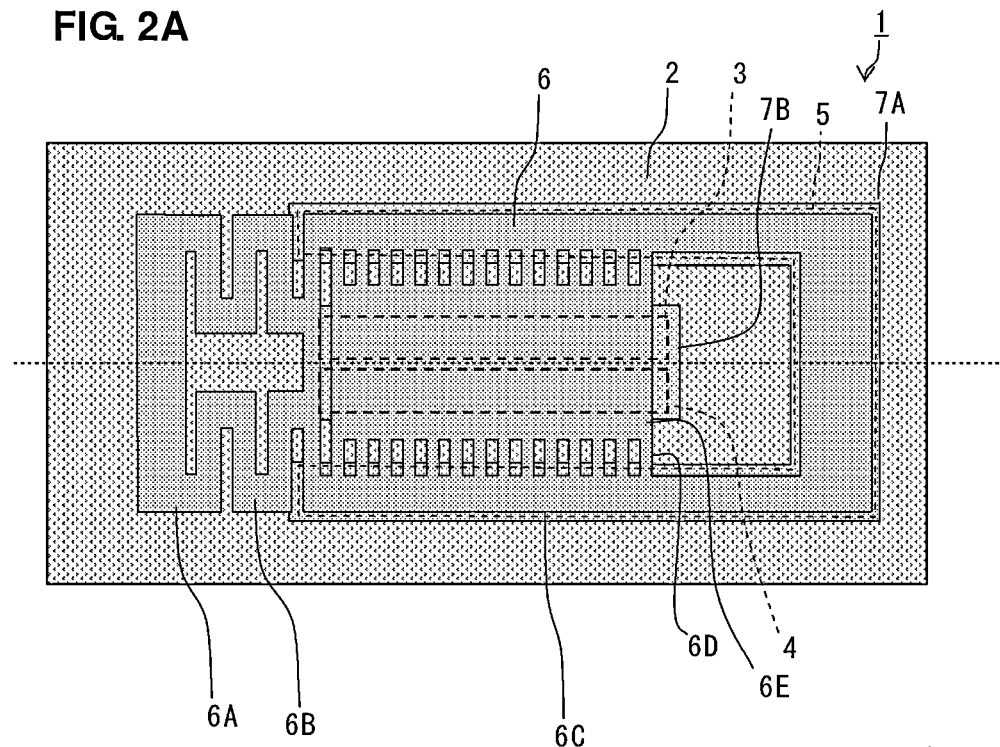
FIGS. 2A-2C are diagrams for explaining a configuration example of a variable capacitance device according to a first preferred embodiment of the present invention.
Figure 2B:
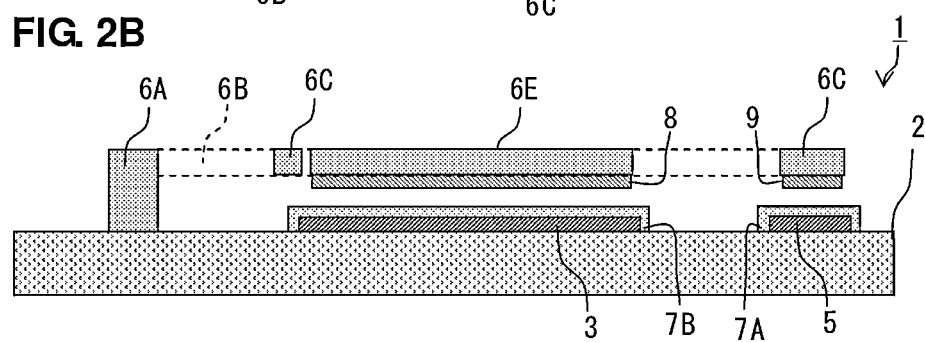
Figure 2C:
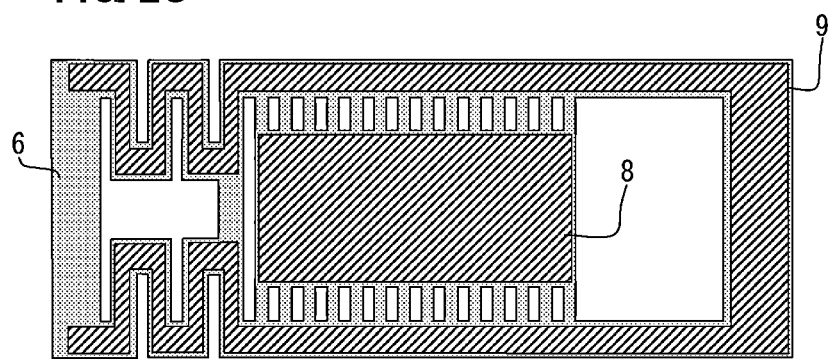

FIG. 2A is a plan view of the variable capacitance device 1. FIG. 2B is a cross-sectional side view of the variable capacitance device 1 in a non-driven state. FIG. 2C is a bottom view of a beam portion 6 included in the variable capacitance device 1.

The variable capacitance device 1 includes a substrate 2, lower drive electrodes 3, 4, and 5, the beam portion 6, dielectric films 7A and 7B, and upper drive electrodes 8 and 9. The substrate 2 preferably is a glass substrate or other suitable substrate, for example. The beam portion 6 is preferably defined by a high-resistivity Si substrate (insulating material) having a resistivity of about 5 kΩcm or more, desirably about 10 kΩcm or more, and preferably is manufactured by a method such as an FZ method, for example. Each of the lower drive electrodes 3, 4, and 5 is preferably defined by a molybdenum electrode or a tungsten electrode or by a conductive material, such as Pt/Au/Pt/NiCr, for example. Each of the dielectric films 7A and 7B is preferably defined by a dielectric material, such as $Ta_2O_5$, $Al_2O_3$, SiN, $SiO_2$, and AlN, for example.

The beam portion 6 has the shape of a flat plate provided with a plurality of openings, has longer sides extending in a principal axis direction indicated by a dotted line in the figures, and includes an anchor portion 6A, two meandering portions 6B, an outer circumferential portion 6C, two ladder portions 6D, and an inner circumferential portion 6E. The anchor portion 6A preferably has a rectangular or substantially rectangular shape at the left end of the beam portion 6 in the figures, and is bonded to the substrate 2 to support the meandering portions 6B, the outer circumferential portion 6C, the ladder portions 6D, and the inner circumferential portion 6E, which are separated from the substrate 2. The two meandering portions 6B connect the outer circumferential portion 6C and the anchor portion 6A, and support a support end of the beam portion 6 not as a fixed end but as a rotational end. The shape of the meandering portions 6B connecting the anchor portion 6A and the outer circumferential portion 6C may correspond to a curved structure, a perforated structure, or other suitable structure. The outer circumferential portion 6C preferably has a rectangular ring or substantially rectangular ring shape. The inner circumferential portion 6E preferably has a rectangular or substantially rectangular shape, and is disposed inside the ring of the outer circumferential portion 6C. Each of the ladder portions 6D is preferably defined by openings and bridge portions alternately arranged along the principal axis direction, and is disposed between the outer circumferential portion 6C and the inner circumferential portion 6E to connect a side of the inner circumferential portion 6E and a side of the outer circumferential portion 6C extending parallel or substantially parallel to each other along the principal axis direction. With the provision of this ladder portion 6D, the cross-sectional area along the principal axis direction in the region provided with the ladder portion 6D is reduced, as compared with other surrounding regions. Further, the flexibility of the beam portion 6 along the principal axis direction is improved, and the deformation of the beam portion 6 is controllable with high accuracy.

The lower drive electrodes 3 and 4 are rail-shaped electrodes including longer sides extending along the principal axis direction of the beam portion 6 (lateral direction in the figures), and are located on the upper surface of the substrate 2. The lower drive electrode 5 preferably is a U-shaped electrode including opposite ends defining rail-shaped electrodes including longer sides along the principal axis direction of the beam portion 6 (lateral direction in the figures), and is located on the upper surface of the substrate 2. The dielectric film 7A is laminated on the substrate 2 to cover the lower drive electrode 5, and the dielectric film 7B is laminated on the substrate 2 to cover the lower drive electrodes 3 and 4. The opposite ends of the lower drive electrode 5 are disposed on both sides of the lower drive electrodes 3 and 4 to sandwich the lower drive electrodes 3 and 4. The lower drive electrode 3 is connected to an input terminal (or output terminal) of an RF signal, and the lower drive electrode 4 is connected to an output terminal (or input terminal) of the RF signal. The lower drive electrode 5 is connected to a DC voltage terminal.

The upper drive electrode 8 preferably has a rectangular or substantially rectangular shape on the lower surface of the inner circumferential portion 6E of the beam portion 6 to face the lower drive electrodes 3 and 4 via the dielectric film 7B. The upper drive electrode 9 is connected to a not-illustrated GND line and arranged on the respective lower surfaces of the outer circumferential portion 6C and the meandering portions 6B of the beam portion 6 to face the lower drive electrode 5 via the dielectric film 7A. The upper drive electrodes 8 and 9 are preferably defined by tungsten electrodes or molybdenum electrodes.

The lower drive electrodes 3 and 4 and the upper drive electrode 8 face each other via the dielectric film 7B, and define a variable capacitor portion of the present invention. The variable capacitor portion generates, between the lower drive electrodes 3 and 4, a capacitance which changes in accordance with the contact area between the inner circumferential portion 6E of the beam portion 6 and the dielectric film 7B.

Further, the lower drive electrode 5 and the upper drive electrode 9 face each other via the dielectric film 7A, and define a drive capacitance portion according to a preferred embodiment of the present invention. In the drive capacitance portion, electrostatic capacitance is generated by the DC voltage and the ground, and electrostatic attraction facilitating the deformation of the beam portion 6 is generated from the electrostatic capacitance.

The variable capacitor portion preferably has a structure in which the lower drive electrodes 3 and 4 applied with signals are coupled via the upper drive electrode 8 to series-connect two pairs of electrodes (hereinafter referred to as MIMIM structure). Meanwhile, the drive capacitance portion preferably has a structure in which a voltage is directly applied to a pair of facing electrodes (hereinafter referred to as MIM structure). In the MIMIM structure, the electrostatic attraction per area is less than in the MIM structure. The variable capacitor portion adopting the MIMIM structure, therefore, significantly reduces and prevents the deformation of the beam portion 6 based on the high-voltage RF signal, and is advantageous in significantly reducing and preventing capacitance fluctuation due to self-actuation. Further, the drive capacitance portion including the MIM structure has high electrostatic attraction per area, and is advantageous in reducing the electrode area.

Subsequently, description will be made of an operation example of the variable capacitance device 1 according to the application of a DC voltage.

In a non-driven state illustrated in FIG. 2B, a reference DC voltage is not applied to the lower drive electrode 5, and a drive capacitance is not generated between the lower drive electrode 5 and the upper drive electrode 9. Therefore, the beam portion 6 is not subjected to electrostatic attraction and is undeformed, and the upper drive electrodes 8 and 9 on the beam portion 6 are separated from the dielectric films 7A and 7B. Accordingly, the variable capacitance between the lower drive electrodes 3 and 4 has a substantially small value.

Figure 3A:
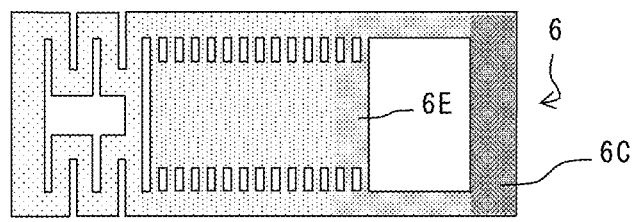
FIGS. 3A-3F are diagrams for explaining an operation example of the variable capacitance device of FIG. 2.
Figure 3B:
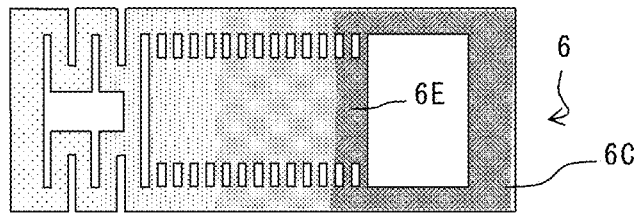
Figure 3C:
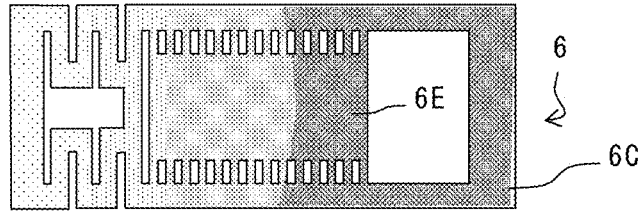
Figure 3D:
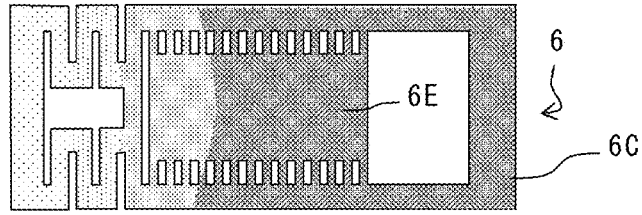
Figure 3E:
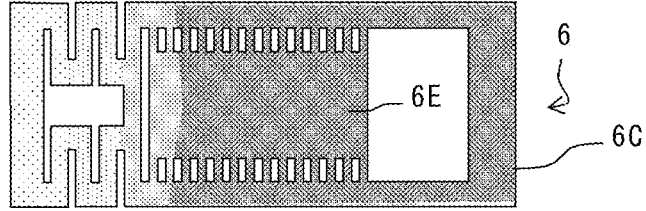
Figure 3F:
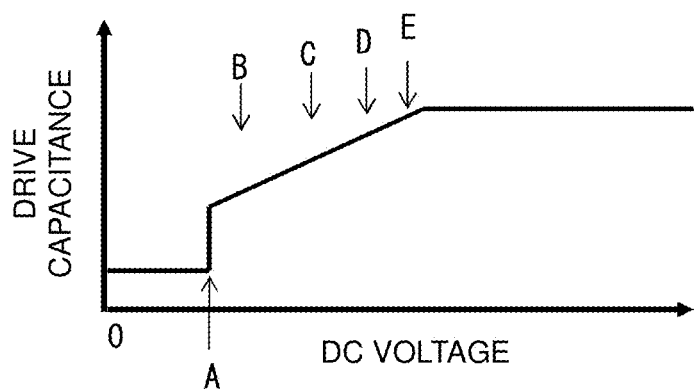

FIGS. 3A-3F are diagrams for explaining an operation example of the variable capacitance device 1 in a driven state. The representation of regions in different densities in the figure indicates the distance of the beam portion 6 from the substrate 2. In the most darkly illustrated regions, the beam portion 6 is in contact with the dielectric films 7A and 7B provided on the substrate 2. Illustrated herein are states according to the increase in DC voltage from FIG. 3A toward FIG. 3B, FIG. 3C, FIG. 3D, and FIG. 3E. FIG. 3F is a diagram illustrating the relationship between the DC voltage and the drive capacitance.

When the DC voltage is applied to the lower drive electrode 5, a drive capacitance is generated between the lower drive electrode 5 and the upper drive electrode 9. Therefore, the beam portion 6 is subjected to electrostatic attraction and deformed, and an end of the beam portion 6 (outer circumferential portion 6C) is in contact with the dielectric film 7A (see FIG. 3A).

If the DC voltage is then increased, the bending of the beam portion 6 is increased, and an end of the inner circumferential portion 6E comes into contact with the dielectric film 7B (see FIG. 3B). Thereby, capacitances are generated between the lower drive electrodes 3 and 4 and the upper drive electrode 8, and the lower drive electrodes 3 and 4 are connected together by a variable capacitance. Thereby, the RF signal is propagated. Further, if the DC voltage is further increased, the contact area between the outer and inner circumferential portions 6C and 6E and the dielectric films 7A and 7B is increased (see FIGS. 3C-3E), and the variable capacitance is also increased accordingly. Even when the DC voltage exceeds a predetermined value, the variable capacitance is kept constant, if the entire lower surface of the beam portion 6 is in contact with the dielectric films 7A and 7B.

Subsequently, an equivalent circuit of the variable capacitance device 1 will be described.

Figure 4A:
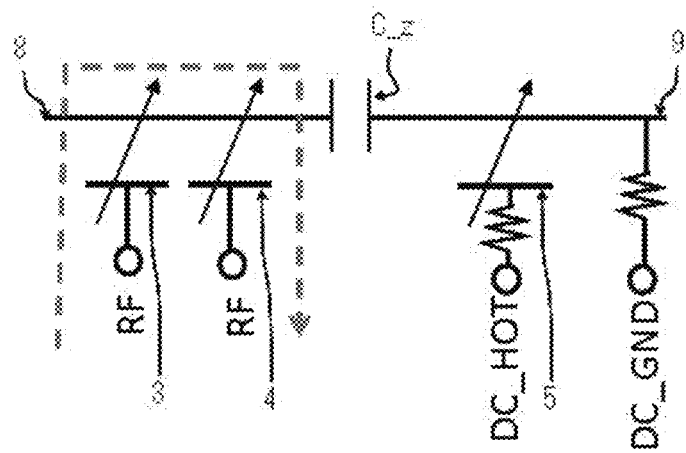
FIGS. 4A and 4B are diagrams for explaining an equivalent circuit of the variable capacitance device of FIG. 2.

FIG. 4A is an equivalent circuit diagram of the variable capacitance device 1.

The lower drive electrodes 3 and 4 face the upper drive electrode 8, and define a variable capacitor portion having a MIMIM structure including two capacitances connected in series between two RF signal terminals. Further, the lower drive electrode 5 faces the upper drive electrode 9, and defines a drive capacitance portion having a MIM structure connected between a DC terminal and a ground terminal. Between the variable capacitor portion and the drive capacitance portion, a coupling capacitance C_z is generated via the beam portion 6 made of the aforementioned dielectric material. The beam portion 6 is provided with the ladder portions 6D to reduce the cross-sectional area between the variable capacitor portion and the drive capacitance portion. Therefore, the coupling capacitance C_z is substantially more reduced than in a case where the ladder portions 6D are not provided. Accordingly, it is possible to separate the DC voltage applied to the drive capacitance portion from the RF signal applied to the variable capacitor portion without causing an increase in insertion loss.

Figure 4B:
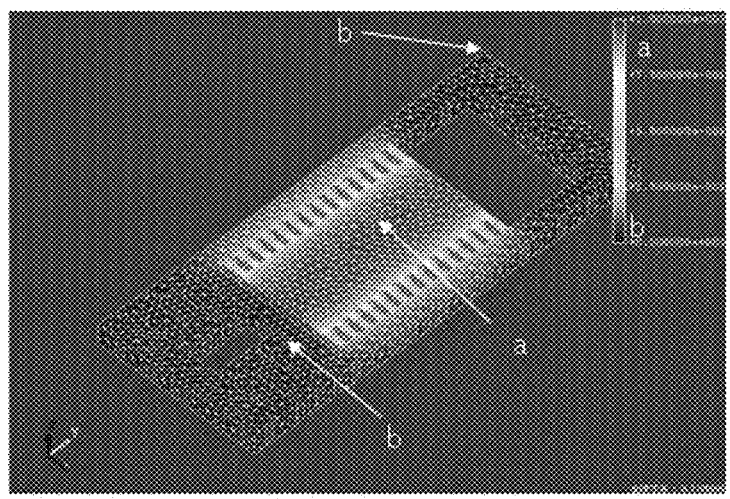

FIG. 4B is a diagram illustrating a distribution example of the coupling capacitance C_z in the beam portion 6 based on finite element analysis.

The finite element analysis was performed with meshes of about 10 μm, for example. A Si substrate having a thickness of about 30 μm and a permittivity ∈r of about 11.8 was preferably used as the beam portion 6, and tungsten electrodes having a thickness of about 200 nm were preferably used as the upper drive electrodes 8 and 9, for example. According to the analysis result of this example, a reduction in coupling capacitance around the ladder portions 6D was confirmed, and the coupling capacitance C_z between the variable capacitor portion and the drive capacitance portion was about $1.75 \times 10^{-2}$ pF, for example.

Herein, a non-limiting setting example of the resistivity (Ωcm) of the beam portion 6 will be described.

Figure 5A:
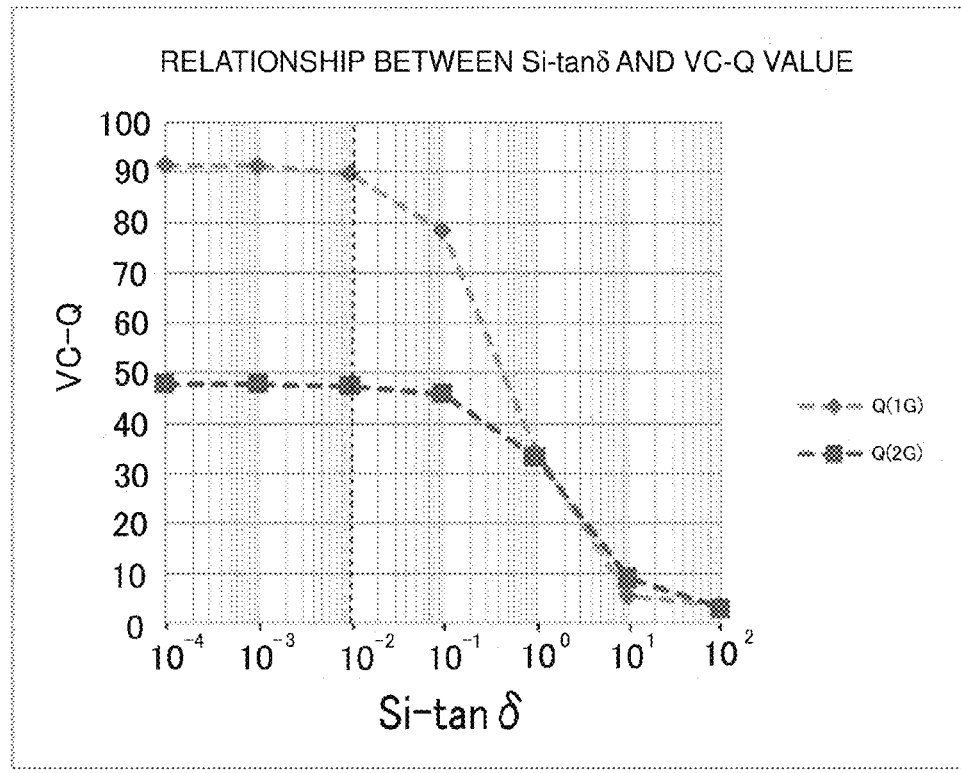
FIGS. 5A and 5B are diagrams for explaining setting of resistivity of a beam portion of the variable capacitance device of FIG. 2.
Figure 5B:
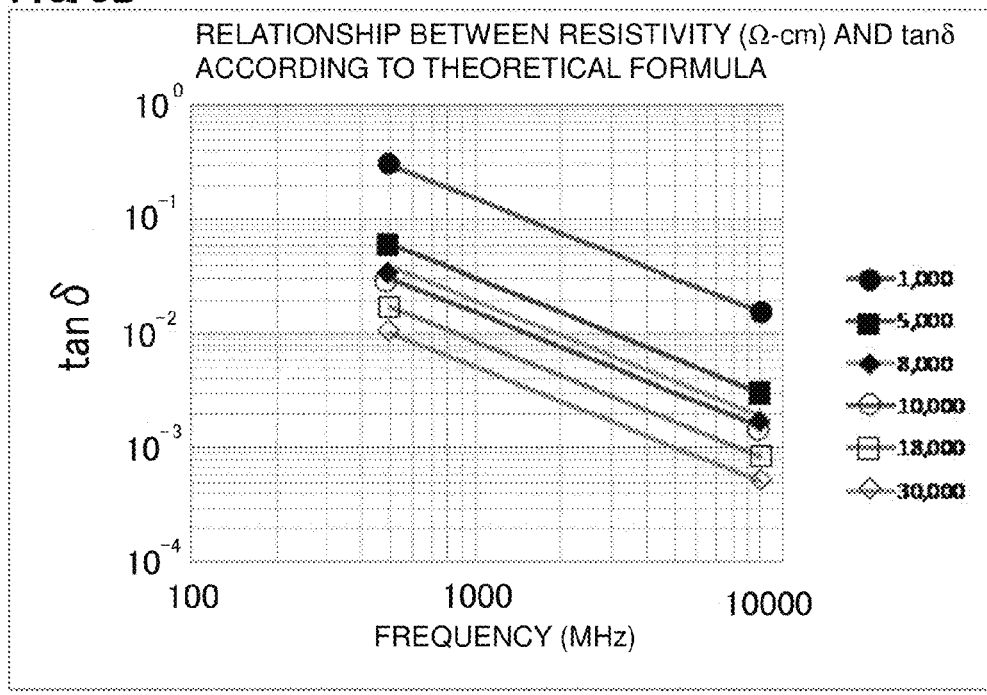

FIG. 5A is a diagram for explaining the relationship between tan δ (dielectric loss) of silicon and VC-Q value (Q value of variable capacitance) in a case where the coupling capacitance C_z is set to about 0.1 pF. FIG. 5B is a diagram for explaining the relationship between tan δ and frequency in a case where the resistivity of the beam portion 6 is set to approximate values of 1 kΩcm, 5 kΩcm, 8 kΩcm, 10 kΩcm, 18 kΩcm, or 30 kΩcm, for example.

According to FIG. 5A, if tan δ is less than about 0.01, the VC-Q value is constant. Therefore, it can be said that the variable capacitor portion and the drive capacitance portion are sufficiently electrically insulated from each other, and that the loss of the RF signal is reduced. Meanwhile, if tan δ is more than about 0.01, the variable capacitor portion and the drive capacitance portion are not sufficiently electrically insulated from each other, and the loss of the RF signal is increased. Therefore, it can be said that tan δ of the beam portion 6 is desired to be less than about 0.01.

According to FIG. 5B, the resistivity corresponding to tan δ less than the above-described about 0.01 varies depending on the usable frequency range of the variable capacitance device 1. If the resistivity is about 10 kΩcm, tan δ is less than about 0.01 in a frequency range of about 2000 MHz and higher, for example.

It was determined from these discoveries that, if the usable frequency range of the variable capacitance device 1 is set to a frequency range of about 2000 MHz and higher, it is possible to sufficiently electrically insulate the variable capacitor portion and the drive capacitance portion from each other and significantly reduce and prevent the loss of the RF signal by forming the beam portion 6 with a high-resistivity Si substrate having a resistivity of about 10 kΩcm, provided that the coupling capacitance C_z is about 0.1 pF, for example.

Subsequently, description will be made of the material setting of the upper drive electrodes 8 and 9 attached to the beam portion 6.

When, for example, anodic bonding or other suitable process is adopted during bonding of a glass substrate and a high-resistivity Si substrate in the manufacturing process, a heat load of approximately 400° C. may act on the upper drive electrodes 8 and 9. Such a heat load may cause material interdiffusion with the beam portion 6 or surface roughness of the upper drive electrodes 8 and 9. It is therefore preferable to use tungsten or molybdenum, which is a high melting point material, as the upper drive electrodes 8 and 9 to significantly reduce and prevent the electrode surface roughness and the material interdiffusion and thereby stabilize the driving performance of the variable capacitance device 1.

Figure 6A:
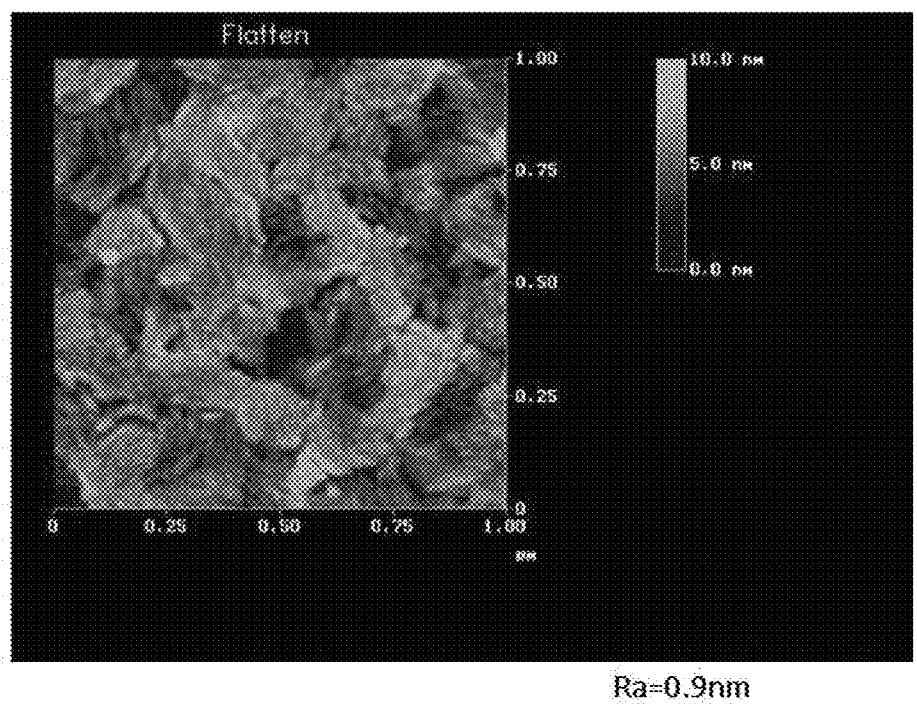
FIGS. 6A and 6B are diagrams for explaining surface roughness of upper drive electrodes of the variable capacitance device of FIG. 2.
Figure 6B:
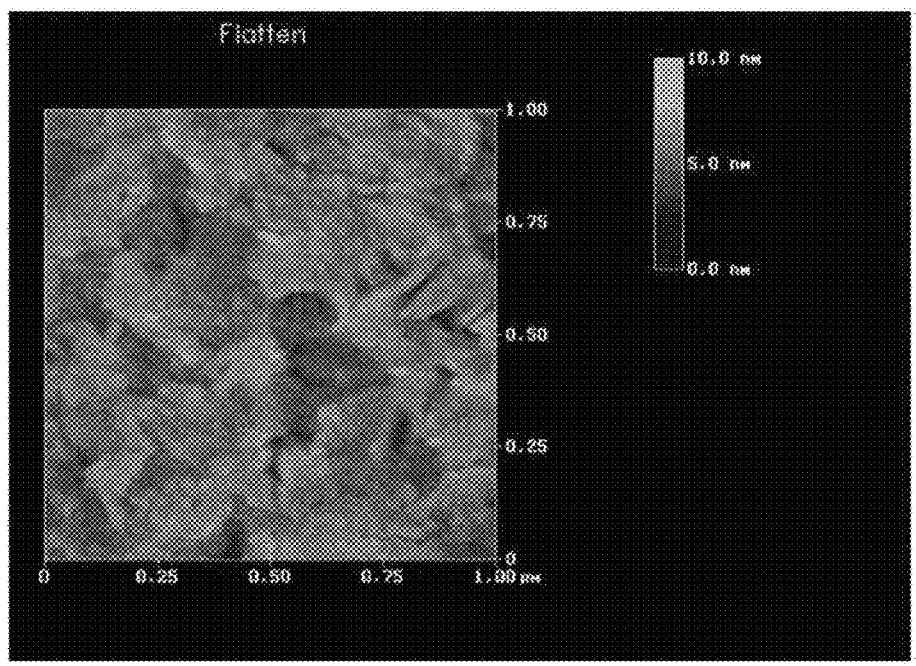

An experiment was conducted to check the change in surface roughness in a case where tungsten electrodes are adopted as the upper drive electrodes 8 and 9. In the experiment, the upper drive electrodes 8 and 9 attached to the beam portion 6 were heated for one hour with a heat load of 430° C., for example. FIG. 6A is a diagram illustrating the surface state of the tungsten electrodes before the heat treatment, and FIG. 6B is a diagram illustrating the surface state of the tungsten electrodes after the heat treatment. A surface roughness Ra=0.9 nm of the tungsten electrodes before the action of the heat load changed to Ra=1.0 nm after the action of the heat load. This level of degradation in surface roughness practically causes no problem. It was therefore confirmed that a favorable electrode surface roughness is obtainable by at least adopting tungsten electrodes.

Figure 7:
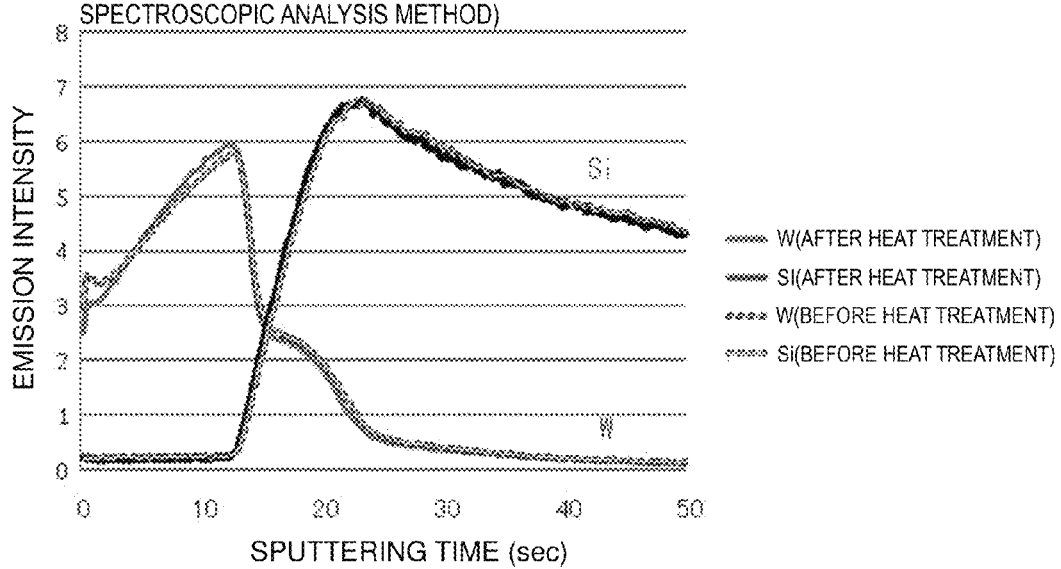
FIG. 7 is a diagram for explaining material interdiffusion between the upper drive electrodes and the beam portion of the variable capacitance device of FIG. 2.

Further, the material interdiffusion occurring in a case where the upper drive electrodes 8 and 9 are formed by a sputtering method was analyzed by a high-frequency glow discharge emission spectroscopic analysis method. FIG. 7 is a diagram illustrating the relationship between the emission intensity measured by the high-frequency glow discharge emission spectroscopic analysis method and the sputtering time. The measurement of the emission intensity was performed before and after the heat treatment of the high-resistivity Si substrate and the tungsten electrodes. As a result, a change in emission intensity between before and after the heat treatment hardly occurred. It was confirmed from this that it is possible to significantly reduce and prevent the material interdiffusion by at least adopting tungsten electrodes.

Further, due to the difference in coefficient of linear expansion between the high-resistivity Si substrate and the upper drive electrodes 8 and 9, the use of the variable capacitance device 1 under high-temperature environment may cause warping of the high-resistivity Si substrate due to thermal stress. Such warping tends to result in variations among products, and may cause variations in drive voltage. If material setting reducing the difference in coefficient of linear expansion between the high-resistivity Si substrate and the upper drive electrodes 8 and 9 is adopted, therefore, the driving performance of the variable capacitance device 1 is stabilized, and thus such setting is preferable.

FIG. 8A is a diagram for explaining coefficients of linear expansion of various materials. Tungsten and molybdenum are metals close in coefficient of linear expansion to silicon and glass. Therefore, tungsten electrodes were preferably used as the upper drive electrodes 8 and 9, and deformation in a heated state at about 125° C. was calculated with reference to about 25° C. of the beam portion 6, for example. The high-resistivity Si substrate was set to a thickness of about 30 μm, and the upper drive electrodes 8 and 9 were formed by tungsten electrodes having a thickness of about 200 nm, for example. FIG. 8B is a perspective view of the beam portion 6 in that case, and FIG. 8C is a side view of the beam portion 6. As a result of the calculation, the beam portion 6 was deformed in the opposite direction to the substrate 2, and the maximum displacement of an end portion thereof was approximately 62 nm, for example. This level of warping of the beam portion 6 practically causes no problem. It was therefore configured that it is possible to significantly reduce and prevent warping due to the difference in coefficient of linear expansion by at least adopting tungsten electrodes.

Further, if the upper drive electrodes 8 and 9 are formed by the sputtering method, internal stress remains in the upper drive electrodes 8 and 9, and becomes a factor causing the warping of the beam portion 6. As to this internal stress, sputtering gas pressure and sputtering power in the sputtering method are adjustable. It is therefore preferable to adjust the settings of the sputtering method such that the internal stress is equal to or less than, for example, ±500 MPa, to thereby minimize the warping of the beam portion 6 and stabilize the driving performance of the variable capacitance device 1.

Figure 9A:
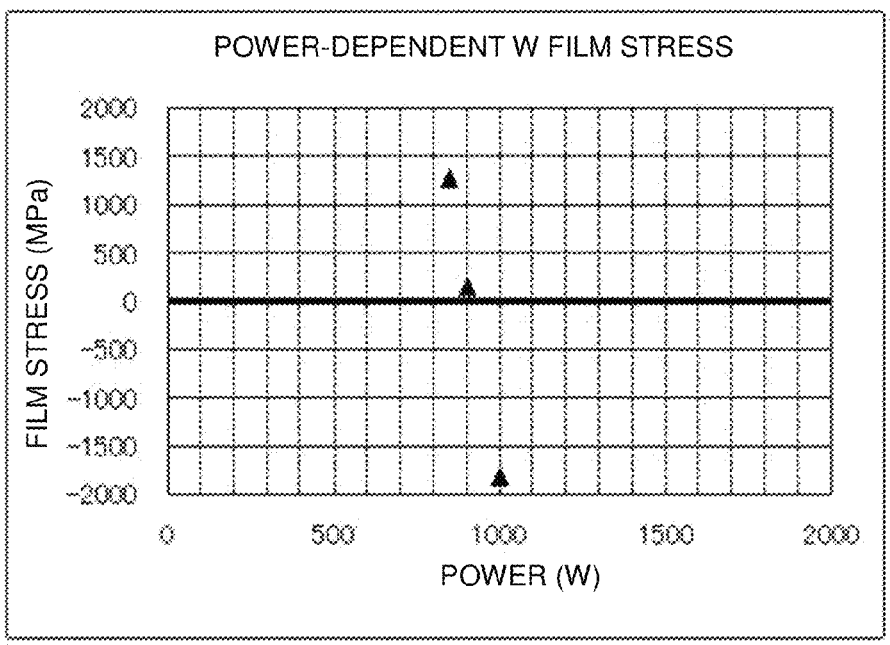
FIGS. 9A and 9B are diagrams for explaining settings in sputtering formation of the upper drive electrodes of the variable capacitance device of FIG. 2.
Figure 9B:
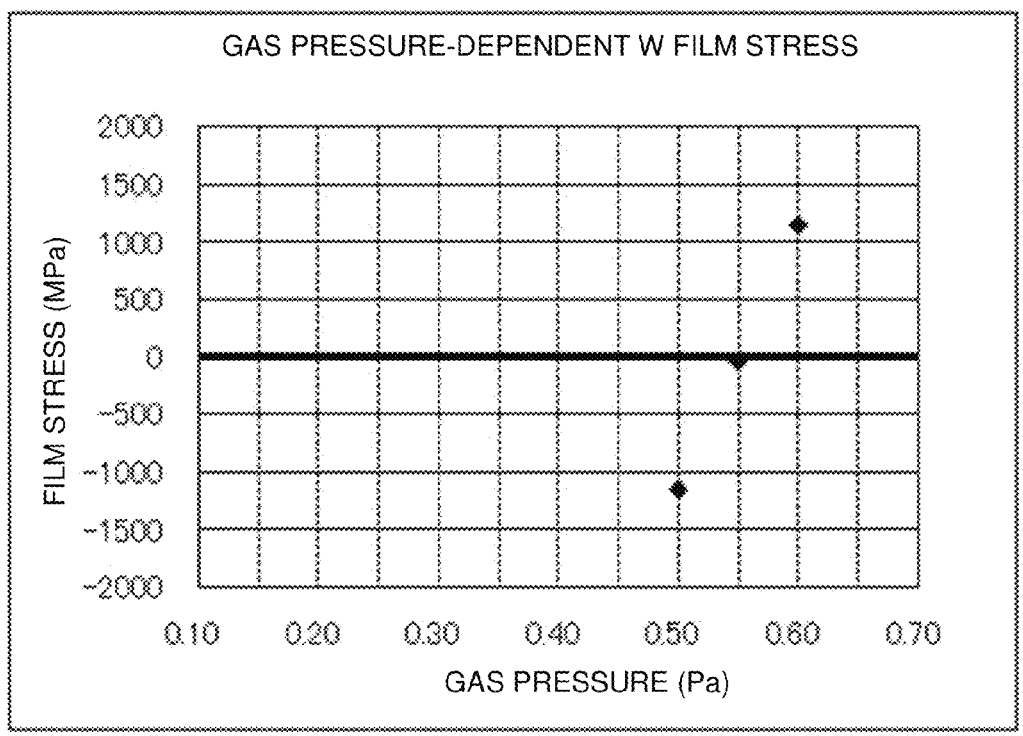

FIG. 9A is a diagram exemplifying the relationship between the sputtering power and the internal stress, and FIG. 9B is a diagram exemplifying the relationship between the sputtering gas pressure and the internal stress. It is confirmable from these diagrams that the internal stress remaining in the tungsten electrodes depends on the sputtering power and the sputtering gas pressure, and that there are a setting of the sputtering power and a setting of the sputtering gas pressure capable of minimizing the internal stress.

For example, if a plurality of laser lights are applied to a surface of a substrate being subjected to film formation by the sputtering method, and if the change in reflected light thereof is monitored, it is possible to monitor film stress during the film formation. If the stress during the film formation is finely adjusted on the basis of the information, it is possible to form a film having desired internal stress, and to stably minimize the internal stress.

Subsequently, description will be made of a configuration example of a VMD 21 according to a second preferred embodiment of the present invention.

Figure 10A:
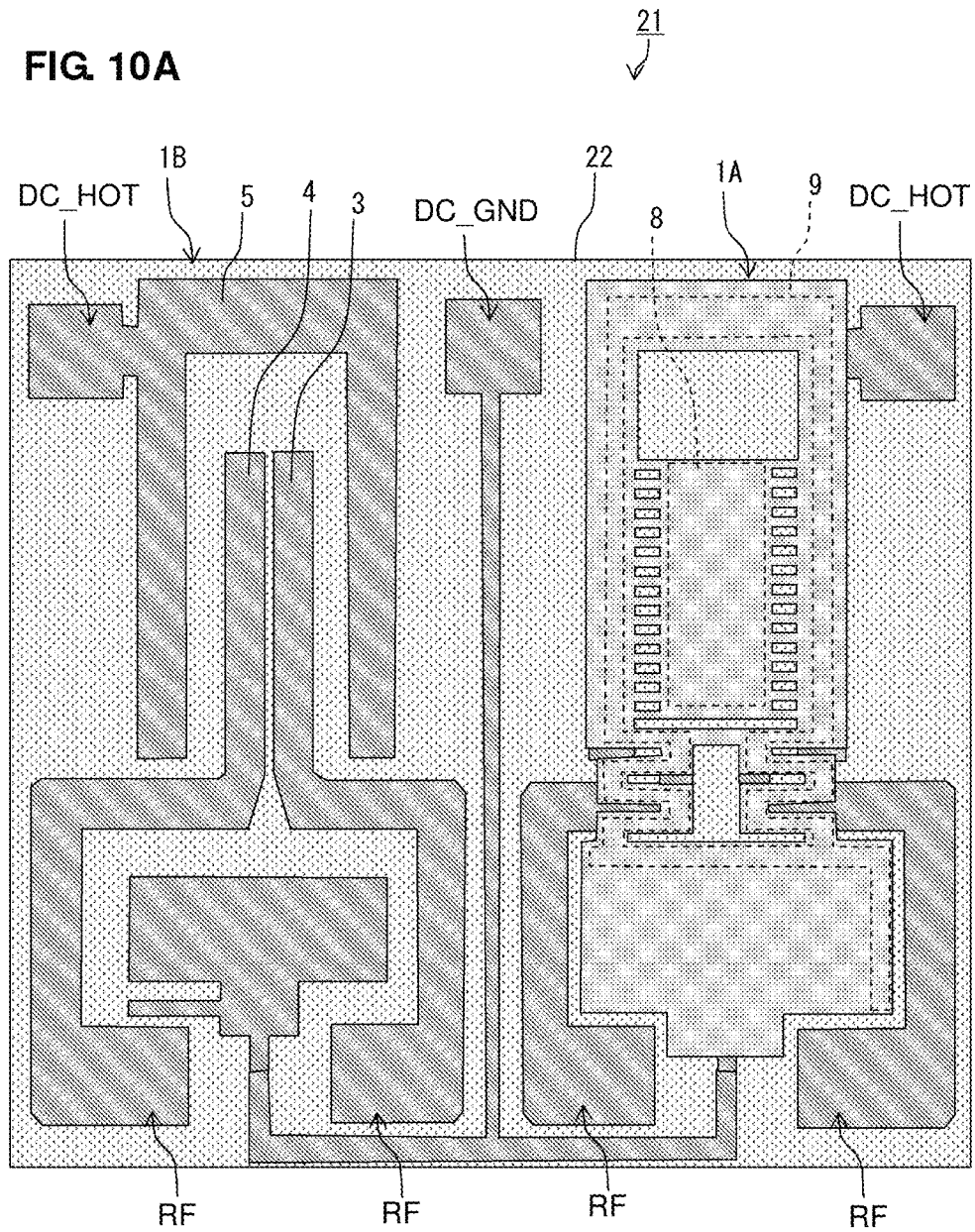
FIGS. 10A and 10B are diagrams for explaining a configuration example of a variable capacitance device and a VMD according to a second preferred embodiment of the present invention.

FIG. 10A is a partial perspective view for explaining a schematic configuration of the VMD 21 of the present preferred embodiment. The VMD 21 has a package structure in which two variable capacitance devices 1A and 1B are provided on a single substrate 22. The diagram illustrates the variable capacitance device 1A, which is one of the two variable capacitance devices, and illustrates the other variable capacitance device 1B with a beam portion and upper drive electrodes thereof illustrated in a transparent manner. The variable capacitance devices 1A and 1B are line-symmetrically provided on the substrate 22 and share a ground terminal DC_GND, and thereby a reduction in size is attained when two MEMS elements are included in one chip. A not-illustrated cover structure may be provided to define a configuration in which the two variable capacitance devices 1A and 1B are sealed between the substrate 22 and the cover structure. In that case, it is preferable to form the cover structure with a glass or Si substrate, for example.

Figure 10B:
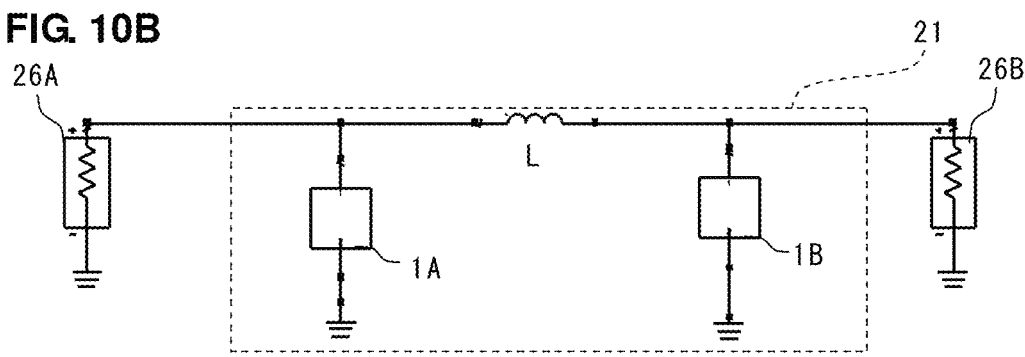

FIG. 10B is an equivalent circuit diagram of the VMD 21. One of the RF terminals in the variable capacitor portion of the variable capacitance device 1A and one of the RF terminals in the variable capacitor portion of the variable capacitance device 1B are connected together via an inductor L, and the opposite ends of the inductor L are connected to a first external load 26A and a second external load 26B. The variable capacitances of the variable capacitance devices 1A and 1B are controlled to match the impedance of the first external load 26A with the impedance of the second external load 26B. With this use of the VMD 21, a reduction in size of the VMD device 21 is possible.

Subsequently, description will be made of a configuration example of a VMD 31 according to a third preferred embodiment of the present invention.

Figure 11:
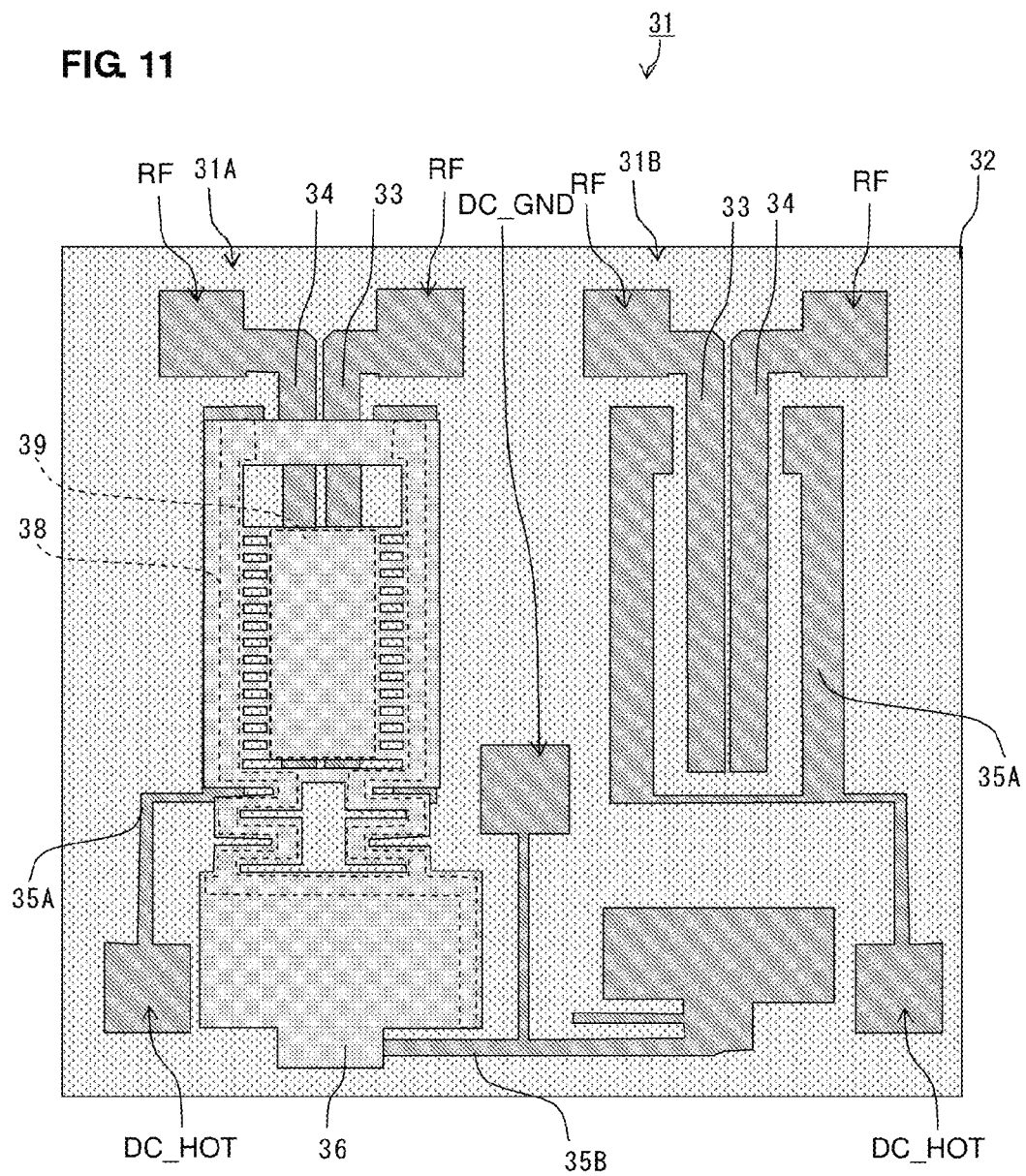
FIG. 11 is a diagram for explaining a configuration example of a variable capacitance device and a VMD according to a third preferred embodiment of the present invention.

FIG. 11 is a partial perspective view for explaining a schematic configuration of the VMD 31. The VMD 31 preferably has a package structure in which two variable capacitance devices 31A and 31B are provided on a single substrate 32. The diagram illustrates the variable capacitance device 31A, which is one of the two variable capacitance devices, and illustrates the other variable capacitance device 31B with a beam portion and upper drive electrodes thereof illustrated in a transparent manner.

The variable capacitance device 31A includes lower drive electrodes 33, 34, 35A, and 35B, a beam portion 36, dielectric films (not illustrated), and upper drive electrodes 38 and 39. The lower drive electrodes 33 and 34 are respectively connected to an input terminal and an output terminal of the RF signal, and the lower drive electrodes 35A and 35B are respectively connected to an input terminal of the DC voltage and the ground. The lower drive electrodes 33 and 34 face the upper drive electrode 39, and define a variable capacitor portion of the present invention. The lower drive electrode 35A faces the upper drive electrode 38, and defines a drive capacitance portion of the present invention. The variable capacitance device 31B is symmetrical in configuration to the variable capacitance device 31A.

In the present preferred embodiment, the variable capacitance device 31A is preferably configured such that the lower drive electrodes 33 and 34 do not face the upper drive electrode 38. In the foregoing variable capacitance devices 1A and 1B, the lower drive electrodes 3 and 4 locally face the upper drive electrode 9, and a minute parasitic capacitance is generated. Meanwhile, the variable capacitance devices 31A and 31B of the present preferred embodiment are capable of preventing the generation of such a parasitic capacitance, and electrical separation of the RF signal and the DC voltage is improved.

The electrode shape and so forth of the variable capacitance device may be thus changed as appropriate, and it is possible to preferably implement a preferred embodiment of the present invention by configuring the beam portion to be locally reduced in cross-sectional area, as in a ladder structure or other suitable structure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A variable capacitance device comprising:
   a substrate;
   an insulating beam portion including an end portion extending in a principal axis direction and connected to the substrate via an anchor structure;
   a drive capacitance portion including a pair of rail-shaped drive electrodes including longer sides extending in the principal axis direction, one of the pair of drive electrodes being provided on the beam portion and another one of the pair of drive electrodes being provided on the substrate such that an electrostatic attraction acting between the two drive electrodes continuously changes in accordance with an electrostatic capacitance generated in response to application of a DC voltage; and a variable capacitor portion including a pair of rail-shaped variable capacitive electrodes including longer sides extending in the principal axis direction, one of the pair of variable capacitive electrodes being provided on the beam portion and another one of the pair of variable capacitive electrodes being provided on the substrate such that an electrostatic capacitance generated in response to application of an RF signal between the two variable capacitive electrodes continuously changes in accordance with the electrostatic attraction; wherein the beam portion has a structure in which a region sandwiched by a region including the variable capacitor portion and a region including the drive capacitance portion is locally reduced in cross-sectional area per unit length along the principal axis direction.

2. The variable capacitance device described in claim 1, wherein, in the beam portion, the region locally reduced in cross-sectional area is provided in plurality along the principal axis direction.

3. The variable capacitance device described in claim 1, wherein the region locally reduced in cross-sectional area includes openings penetrating two main surfaces of the beam portion.

4. The variable capacitance device described in claim 1, wherein the variable capacitor portion includes another pair of rail-shaped variable capacitive electrodes defined by the variable capacitive electrode provided on the beam portion and another variable capacitive electrode provided on the substrate, and the RF signal is applied between each of the variable capacitive electrode and the another variable capacitive electrode provided on the substrate and the variable capacitive electrode provided on the beam portion.

5. The variable capacitance device described in claim 1, wherein the drive capacitance portion is arranged such that the DC voltage is applied to the drive electrode provided on the beam portion and the drive electrode provided on the substrate.

6. The variable capacitance device described in claim 1, wherein the beam portion has a cantilever beam structure.

7. The variable capacitance device described in claim 1, wherein the beam portion is defined by a high-resistivity Si substrate, the substrate is defined by a glass substrate, and the drive electrode and the variable capacitive electrode provided on the beam portion are defined by tungsten electrodes or molybdenum electrodes.

8. The variable capacitance device described in claim 7, wherein the drive electrode and the variable capacitive electrode provided on the beam portion are made of sputtered material.

* * * * *